Figures 1, 2, 3:
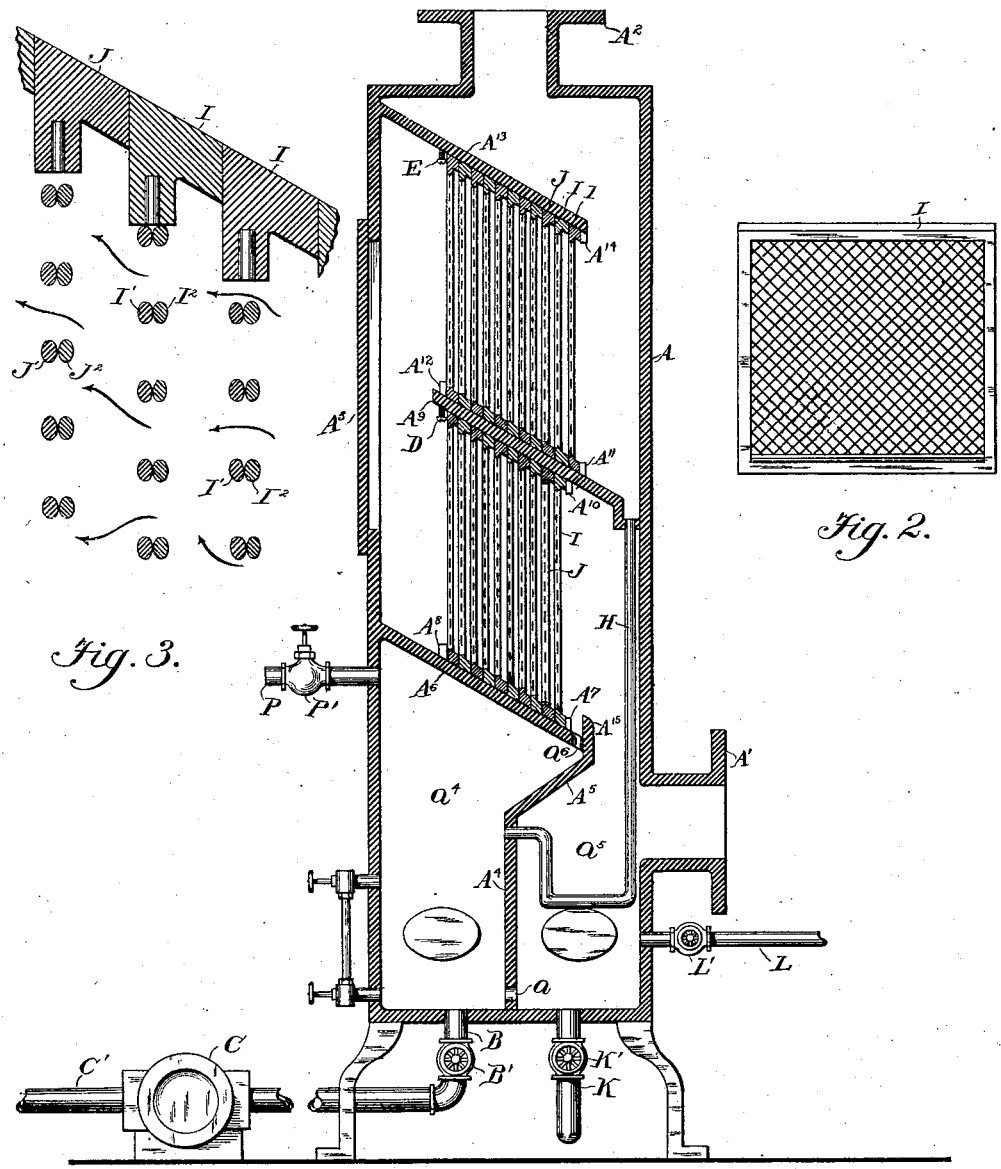

No. 718,805. PATENTED JAN. 20, 1903.
I. WATTS.
STEAM SEPARATOR.
APPLICATION FILED OCT. 1, 1902.
NO MODEL.

WITNESSES:
Marc A. Guigou.
M. F. Boyle.

INVENTOR
Ira Watts
BY
Thomas Drew Stetson
ATTORNEY

UNITED STATES PATENT OFFICE.

IRA WATTS, OF MOUNT VERNON, NEW YORK.

STEAM-SEPARATOR.

SPECIFICATION forming part of Letters Patent No. 718,805, dated January 20, 1903.

Application filed October 1, 1902. Serial No. 125,467. (No model.)

*To all whom it may concern:*

Be it known that I, IRA WATTS, a citizen of the United States, residing in Mount Vernon, in the county of Westchester, in the State of New York, have invented a certain new and useful Improvement in Steam-Separators, of which the following is a specification.

When the steam is discharged through the exhaust-port of a steam-engine after having done its work in the cylinder or cylinders, it is more or less loaded with the oil which has been employed in lubrication. The steam may be condensed, and if such condensation is effected by the use of tubes which separate it from the cold water of condensation the water thus obtained is of unusual purity—pure distilled water—except for the presence of the oil referred to and for the presence of some of the water, technically termed "entrained" water, which is under ordinary conditions blown along with the steam from the boiler without ever having been vaporized.

The object of my invention is to separate the oil and the entrained water from the steam and allow the pure dry steam alone to pass to the heating-pipes or in case of a low-pressure engine to the condenser and be condensed, thereby producing pure distilled water, which it is desired to pump back into the boilers or to be otherwise utilized. The oil and entrained water will usually be very intimately associated, forming a more or less complete emulsion. My apparatus has nothing to do with the separation of the oil from the water, but only with the previous separation of both from the steam.

Any considerable quantity of oil or of the emulsion of oil and water in the boiler is objectionable, inducing various evils, among which is foaming in the boiler, involving a great increase in the quantity of entrained water brought over therewith into the engine. There have been many previous efforts to insure against such evil by purifying the steam. I have devised apparatus which is peculiarly compact and efficient and involves important points of novelty.

I provide two sources of vacuum—a small one which takes out the oil and water which are extracted from the steam and a main vacuum which is felt through the whole apparatus and is available in the ordinary manner to increase the power of the engine—and I proportion them so that the vacuum for the oil and water is a little greater than the other.

The following is a description of what I consider the best means of carrying out the invention.

The accompanying drawings form a part of this specification.

Figure 1 is a central vertical section. Fig. 2 is a face view of one of the parts, which I term "screens," removed. It is on the same scale as in Fig. 1. Fig. 3 is a vertical section of a portion on a much larger scale.

Similar letters of reference indicate corresponding parts in all the figures where they appear.

A is a stout casing of cast-iron or other suitable material; $A'$, a nozzle near the bottom, with which is tightly engaged a pipe (not represented) bringing exhaust-steam from the engine. $A^2$ at the top is a corresponding nozzle, through which the steam after having been cleaned by the removal of its oil and water is allowed to flow through a pipe leading to the place where it is to be utilized for heating or other purpose or to a condenser. (Not shown.)

$A^3$ is a stout cover, by removing which access may be obtained to the interior to introduce and remove the screens, to be presently described.

$A^4 A^5$ represent a partition which divides the bottom of the casing into two chambers $a^4$ $a^5$. The upper portion of this partition is upright, as shown at $A^{15}$. One or more holes $a$ near the base of this partition allows a limited flow of liquid from one side to the other.

B is a discharge-pipe which when working condensingly forms a communication between the bottom of the chamber $a^4$ and a small air-pump C, which latter may be operated from the main engine (not shown) or be worked by a small independent steam-cylinder. Its function is to draw out against the pressure of the external atmosphere the oil and water which collect in the bottom of the casing A, these mingled liquids being discharged through the pipe $C'$ into any convenient receptacle to be subsequently utilized.

As the steam is received through the nozzle $A'$ and is circulated momentarily in the upper portion of the chamber $a^5$ it deposits some of its entrained water and oil in that chamber, but a considerable proportion remains in the steam and is carried upward.

$A^6$ is an inclined partition extending over the chamber $a^4$ in the position represented. $A^7$ is a series of short upright projections, or the whole may be a single continuous lip extending along the lower edge of this incline. $A^8$ is a corresponding series of projections or a lip arranged parallel thereto along a higher line on the incline. This inclined partition $A^6$ and the series of projections $A^7$ and $A^8$ may be cast integral with each other and with the casing. $A^9$ is an inclined partition parallel to the inclined partition $A^6$ and sufficiently higher to allow liberal space for my screens. A series of pendent projections $A^{10}$ extends along a line near the lower edge of this partition, and one or more removable screws D are tapped into the under side of this partition at or near its upper edge. $A^{11}$ and $A^{12}$ are a series of projections or each may be a continuous lip on the upper face of this inclined partition. $A^{13}$ is an inclined partition at a still higher level. Its upper edge may, as shown, exactly coincide with one of the reentering angles in the interior of the casing A. This partition and also a series of projections, or they may be a continuous lip $A^{14}$, are cast integral with the casing A. E indicates one or more removable screws tapped in the under side of $A^{13}$ in the position represented. These inclined partitions $A^6$, $A^9$, and $A^{13}$ are parallel to each other and equidistant, so that the screens which are introduced between may be of uniform size and used interchangeably if required. Each extends across the mid-width portion of the casing and forms a reliable support for the screens; but there is a liberal passage for the steam to move upward past the lower edges of the partitions $A^6$ and $A^{13}$ and past the upper edge of the intermediate partition $A^9$. The junction of the partition $A^9$ with the interior of the casing on the right-hand side in Fig. 1 forms a pocket. H is a pipe leading from such pocket at the lower edge of the partition $A^9$ downward to a low point in the chamber $a^5$, thence horizontally a short distance and up again a little distance and thence through the partition $A^4$, all as plainly shown in Fig. 1.

The screens I and J are removable, each composed of wire-cloth set with all the wires running obliquely—that is to say, the wires both of the warp and the woof are set at an angle of forty-five degrees from the perpendicular. Each screen is formed with a margin or frame of cast-iron, taking a firm hold of the wires and having a size just sufficient to apply in the intervals between the inclined partitions. A sufficient number—I have represented ten—are held in upright positions between the inclined partial partitions $A^6$ and $A^9$. They are held in place at their lower edges by filling the entire space between the series of projections $A^7$ and $A^8$. At the top these screens rest on one side against the series of projections $A^{10}$, and on the other side—the left side in Fig. 1—they are confined by the removable screws D. When the cover $A^3$ is removed, a sufficient opening is presented in the side of the casing A to allow the screens to be introduced one by one, and when all are in place and the screws D are inserted the adjustment of that portion of the apparatus is complete. The screens for the upper series, those between the partitions $A^9$ and $A^{13}$, are similarly introduced and secured by the screws E. Then the cover $A^3$ being restored to place and properly secured by bolts (not shown) the apparatus is ready to serve for a long period. Care must be taken in the construction of the screens to arrange them so that the path traversed by the steam is staggered (crooked) alternately in one direction and another. To attain this, the wire-cloth must be carefully placed in the framing. Most of the liquid will be arrested by the lower series of screens and by the first, second, and third screens in such series. The purpose of the additional screens and finally of the upper series is to insure the more complete and thorough elimination of all the liquid matter from the steam. In the working whenever a particle of liquid matter touches the surface of a wire it adheres and trickles down. The inclined position of the wires insures that the motion shall be rapid and continuous. On reaching the bottom, or in the case of a number of the wires on reaching the proper side of the casing, that toward which the inclination of the wire leads, the particles of liquid are transferred to the interior of the casing, and on reaching the inclined partition on which the bottom of the screen rests its inclination insures its rapid movement laterally until it reaches a pocket and is discharged. The large proportion which is arrested by the first screen—the lowest, the right-hand one in the lower series—flows downward and has to move but a little distance on the lower incline $A^6$ before it reaches the series of apertures $a^6$ and being dammed by $A^{15}$ flows down through them into the chamber $a^4$, where it is entirely out of the current of the steam. The particles which are arrested by the other screens in this series follow the same course, except that they have a longer journey to make down the inclined upper surface of the partition $A^6$. The particles of liquid which are arrested by any of the upper series of screens flow down through the trap-pipe H. They first travel down the wires. On reaching the interior of the casing they move downward, adhering thereto. On reaching the inclined partition $A^9$ they travel down it and flow between the projections of the series $A^{11}$ and reaching the pocket at the lower edge of the partition $A^9$ find an easy passage down through the pipe H into the chamber $a^5$ and by the pipe continued therethrough are delivered into the chamber $a^4$. The downward loop or trap in this pipe insures against any upward flow of steam through this passage to retard the descent of the liquid. I employ cast-iron for the periphery or rim of each screen and fill the interval with stout open-wove wire-cloth, using, for example, wires an eighth of an inch in diameter, set three-eighths of an inch apart, giving clear apertures a quarter of an inch square. At the crossing-points of the wires the current of steam is most resisted. At the center of the rectangular spaces between the wires the passage of the steam is the least resisted. I make the screens of two patterns and sandwich them together. All the screens of each pattern are made as exactly alike as is practicable. In one the frames are marked I and the cross-wires therein are marked I' I$^2$. In this pattern the crossing-points of the wires coincide with the lower edge of the upper side of the frame. In the other pattern the cast-iron frame is marked J and the cross-wires J' and J$^2$. In this second pattern of the screens the wires are set in the mold, and consequently cast in the frame, in a joggled position relatively to those of the other pattern. The displacing of the crossing-points of the wire-cloth in this set relatively to the other must be carefully determined, with proper allowance for the inclination of the partitions, causing the screens to be held at different levels. My regular placing of these partially-arresting frames insures the arresting of the particles of dense liquid with less unnecessary obstruction to the passage of the steam than would be involved if the screens were put in irregularly. All screens placed in succession one behind another in a current of steam arrest the liquids by causing the particles thereof to strike and adhere to the solid surfaces. I ascribe it to the greater inertia of the dense particles as compared to the pure vapor. The vapor can readily change its course; but the heavier particles of oil and entrained water do not change their courses so easily, and they consequently strike the wires and adhere. In introducing these screens into their places on the inclined partitions, as shown, the first screens are of the pattern I I' I$^2$. Then I introduce one screen, J J' J$^2$, then two, I, again, and so on. It results that the points of greatest resistance, the crossing-points of the wires—relatively closed portions of the screens—are so set that the closed portion of one screen is certain from its carefully-determined position to receive the strength of the current flowing through the open portion of the next, and thus compels the steam to make the short bends which are desired.

I attach importance to the inclined position of the wires in either or both of my patterns of screens, because such position produces no horizontal surfaces on which these liquids can hang and form large "drops" to be displaced by the current of steam, and thus blown along from one screen to another.

K is a pipe leading out through the bottom of the chamber $a^5$. It may be used to empty the chamber when required. L is a pipe leading out of the side of the casing at a higher level. This may be used to maintain a certain level of the oil and water surface in the chamber $a^5$. P is a pipe leading outward from the upper portion of the chamber $a^4$. It will be understood that all these must lead to a condenser or some chamber in which a vacuum obtains when my apparatus is used with a condensing-engine. This is of service in allowing a discharge from this point either continuously or at intervals to induce an active circulation in the apparatus when required. Opening the valve P' but a little induces a reduction of pressure in the chamber $a^4$, and thus an active flow down through the passages $a^6$ and also through the pipe H.

B' is a stop-cock controlling the pipe B. K' is a stop-cock controlling the pipe K. L' is a stop-cock controlling the pipe L, and P' is a stop-cock controlling the pipe P.

It will be observed that there are two vacuums—one induced by the condenser (not shown) and which is felt through the nozzle A$^2$ and throughout the main portion of the apparatus, including the entire chamber $a^5$, and is available on the engine (not shown) to increase the power thereof. The other is the vacuum in the chamber $a^4$, which is caused and maintained by the action of the pump C. This pump is so proportioned that it maintains a vacuum in the chamber $a^4$ which is superior to that in $a^5$. Care should be taken to make the aperture $a$, through which the water and oil which gather in the chamber $a^6$ are allowed to flow into the chamber $a^4$, of only moderate capacity, and especially to make the apertures $a^6$ so small that they will be nearly or quite filled with the oil and water which are flowing down. If these apertures $a^6$ be made much too large, they will allow the vapor to flow through so freely that the pump C will not be able to maintain the superior vacuum which is desired.

Modifications may be made without departing from the principle or sacrificing the advantages of the invention. The relative sizes of the chambers $a^4$ and $a^5$ may be varied and also the area of the aperture or apertures $a$, which form a communication between these chambers. I prefer to have these parts about as shown. In the ordinary working the oil and water stand an inch or more higher in the chamber $a^4$ than in the chamber $a^5$. The gage-glass may be connected with the chamber $a^5$ instead of the chamber $a^4$, or there may be a gage-glass on each. Gage-glasses may be dispensed with altogether.

When my apparatus is used in connection with a heating system or with any other provision for subsequently utilizing the steam, there will be an appreciable resistance, amounting sometimes to one pound per square inch or even more. In all such cases I increase the efficiency of the apparatus by leaving the cock P' slightly open, so that by discharging a small and hardly appreciable quantity of the steam through that cock the pressure in the chamber $a^4$ will be less than that in the other portions of the apparatus. This induces an active flow of the water from the chamber $a^5$ through the limited orifice $a$, and, what is still more important, quickens the flow downward and through the trap formed in the pipe H. This insures the active delivery of the oil and water into the chamber $a^4$, from whence they are discharged freely into the atmosphere. When my apparatus is used in a vacuum, the pipes L and P may be closed tightly by means of their stop-cocks L' P'. When I construct the apparatus only for use with a vacuum, these pipes can be omitted. I can use the apparatus in the horizontal instead of the upright position; but for such position the construction should be modified.

Some of the advantages of the invention may be attained by the use of only a portion of the apparatus. I can use perforated plates instead of the obliquely-crossed wires in the screens. I can use screens that are uniform instead of the two kinds described.

I claim as my invention—

1. In a steam-separator a series of removable open-work frames or foraminous plates inclosed in a casing through which the exhaust-steam is led, supported between inclined partitions, in combination therewith and with provisions for leading downward the liquid which is arrested by such obstacles, all substantially as herein specified.

2. In a steam-separator a series of removable open-work frames or foraminous plates inclosed in a casing through which the exhaust-steam is led, arranged with the apertures staggered so as to arrest the dense particles with little obstruction of the steam, all substantially as herein specified.

3. In a steam-separator a series of removable open-work frames or foraminous plates inclosed in a casing through which the exhaust-steam is led, supported between inclined partitions, in combination therewith and with provisions for leading downward the liquid which is arrested by such obstacles, and with the base of the casing divided by a partition $A^4$ $A^5$ to form two chambers for retaining and discharging the liquid with a limited passage $a$ through such partition, all arranged to serve substantially as herein specified.

4. In a steam-separator a series of open-work frames or foraminous plates inclosed in a casing through which the exhaust-steam is led, supported between inclined partitions, in combination therewith and with provisions for leading downward the liquid which is arrested by such obstacles, and with the base of the casing divided by a partition $A^4$ $A^5$ to form two chambers for retaining and discharging the liquid, and with independent means by the pump C for maintaining a greater vacuum in the chamber $a^4$ and thus to insure an active flow downward through the orifices $a^6$ and pipe H, all substantially as herein specified.

In testimony that I claim the invention above set forth I affix my signature in presence of two witnesses.

IRA WATTS.

Witnesses:
 J. B. CLAUTICE,
 M. F. BOYLE.